United States Patent
Pavlov et al.

(10) Patent No.: US 9,282,283 B2
(45) Date of Patent: Mar. 8, 2016

(54) DETECTING PATTERNS TRACED ON A SCREEN OF A USER DEVICE

(71) Applicant: Microsoft Corporation, Redmond, WA (US)

(72) Inventors: Nikolai Pavlov, Tallinn (EE); Onur Cinar, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 14/167,790

(22) Filed: Jan. 29, 2014

(65) Prior Publication Data
US 2015/0215576 A1    Jul. 30, 2015

(51) Int. Cl.
*H04N 7/14* (2006.01)
*G06F 3/0488* (2013.01)

(52) U.S. Cl.
CPC .............. *H04N 7/147* (2013.01); *G06F 3/0488* (2013.01); *G06F 3/04883* (2013.01); *H04N 7/142* (2013.01); *G06F 2203/04101* (2013.01); *H04N 2007/145* (2013.01)

(58) Field of Classification Search
CPC ........... H04N 7/141; H04N 7/14; H04N 7/15; H04N 21/4256; H04N 21/21805; H04N 21/2143; H04N 5/2258; H04N 5/23238; H04N 5/2621; H04N 5/23293; G06F 3/017; G06F 3/0468; G06F 3/04883
USPC .............................. 348/14.01–14.16; 715/863
See application file for complete search history.

(56) References Cited

U.S. PATENT DOCUMENTS

| | | |
|---|---|---|
| 8,451,312 B2 | 5/2013 | Lee et al. |
| 2007/0291009 A1 | 12/2007 | Wright et al. |
| 2011/0085042 A1* | 4/2011 | Lee et al. ...................... 348/159 |
| 2012/0281129 A1 | 11/2012 | Wang et al. |
| 2012/0304132 A1 | 11/2012 | Sareen et al. |
| 2013/0097550 A1* | 4/2013 | Grossman et al. ............ 715/779 |

(Continued)

FOREIGN PATENT DOCUMENTS

WO   WO-2013045533   4/2013

OTHER PUBLICATIONS

"Facetime Be in Two Places at Once", Retrieved from: <http://www.apple.com/ios/facetime/> Oct. 25, 2013, Sep. 16, 2012, 3 Pages.

(Continued)

*Primary Examiner* — Melur Ramakrishnaiah
(74) *Attorney, Agent, or Firm* — Danielle Johnston-Holmes; Micky Minhas (57) ABSTRACT

A user terminal comprising: a network interface; a touchscreen configured to receive a pattern traced by a user; a first camera configured to capture images, wherein the user terminal is configured to transmit said captured images from the first camera to at least one further user terminal via the network interface as part of a video call; a second camera; a memory configured to store information relating to at least one pattern; a detection module configured to detect, using said stored information, one of said at least one pattern traced on an area of the touchscreen of said user terminal; and a control module configured to, in response to the detection by the detection module, switch from the first camera to the second camera so as to capture images using the second camera, the control module causing the said captured images from the second camera to be transmitted via the network interface to said at least one further user device.

20 Claims, 4 Drawing Sheets

(56) References Cited

U.S. PATENT DOCUMENTS

| | | | |
|---|---|---|---|
| 2013/0265378 A1 | 10/2013 | Abuan et al. | |
| 2013/0328997 A1* | 12/2013 | Desai | 348/14.02 |
| 2013/0329100 A1* | 12/2013 | Desai et al. | 348/262 |
| 2014/0033136 A1* | 1/2014 | St. Clair | 715/863 |
| 2014/0211062 A1* | 7/2014 | Kuo et al. | 348/333.01 |

OTHER PUBLICATIONS

Patel "Secondary Camera Switch", Retrieved from: <https://ideasproject.com/idea/-/ideas/641201> Oct. 25, 2013, Site no longer active, Nov. 12, 2011, 9 pages.

Shu, "NEATCamera", Retrieved From: <https://itunes.apple.com/eg/app/neatcamera/id583335417?mt=8> Oct. 25, 2013, Jul. 21, 2013, 2 Pages.

"International Search Report and Written Opinion", Application No. PCT/US2015/012552, Apr. 17, 2015, 12 pages.

"iPad, how to change camera in face time", Retrieved at: https://discussions.apple.com/thread/4247075, Aug. 28, 2012, 3 pages.

Purewal, "How to Video Chat With Tango on Your Android or iOS Device", Retrieved at: http://www.techhive.com/article/242721/how_to_video_chat_with_tango_on_your_android_or_ios_device.html, Oct. 27, 2011, 7 pages.

* cited by examiner

DETECTING PATTERNS TRACED ON A SCREEN OF A USER DEVICE

BACKGROUND

Increasing numbers of user devices are equipped with touchscreen technology, whereby users of the user device interact with the device by directly manipulating graphical symbols of a graphical user interface (GUI) displayed on a screen.

In some instances, in order to instruct the user device to perform a desired function, or to navigate through the menus of the GUI, the user must perform several manipulations of the GUI. Typically, these manipulations involve the user pressing a dedicated icon on the GUI in order to effect the desired action.

SUMMARY

The subject matter pertains to a user terminal which comprises a network interface and a first camera configured to capture images. The user terminal is configured to transmit the captured images from the first camera to at least one further user terminal via the network interface as part of a video call, e.g. a VoIP call over the internet. The user terminal further comprises a second camera and a memory configured to store information relating to at least one pattern. For example, the first and second cameras could be front and back cameras of a smartphone or tablet or the like, or any other pairs of cameras. The user terminal also comprises a detection module configured to detect, using the stored information, a pattern traced on an area of a display screen of the user terminal. E.g., the pattern could be a zigzag or any other suitable pattern. The user terminal further comprises a control module configured to, in response to the detection, switch from the first camera to the second camera so as to capture images using the second camera, the control module causing the captured images from the second camera to be transmitted via the network interface to the at least one further user device as part of the video call.

The subject matter also pertains to a corresponding computer-readable medium having stored thereon instructions which implement the methods described herein.

The subject matter also pertains to a method of detecting a pattern traced on a display of a user device. The method comprises receiving information relating to a pattern traced by a user on the display of the user device. The method further comprises determining from the received information if the pattern traced by the user comprises a series of three gestures. The series of gestures may be traced in a continuous fashion without the tracing implement leaving the display. Alternatively, the tracing implement may be removed from the device after a gesture in the series has been traced. The method also comprises determining from the received information if each gesture in the series has a different motion vector and the relative motions of the motion vectors. The method further comprises determining that a predetermined pattern has been traced on the display of the user device if the traced pattern comprises a series of three gestures and the relative motion vectors of the three gestures are within rules stored in memory which characterise a zigzag, regardless of the location, size and orientation of the traced pattern This summary is provided to introduce a selection of concepts in a simplified form that are further described in the Detailed Description below. This summary is not intended to identify key features of the claimed subject matter, nor is it intended to be used to limit the scope of the claimed subject matter.

DESCRIPTION OF DRAWINGS

For a better understanding of the present disclosure and to show how the same may be put into effect, reference will now be made, by way of example, to the following drawings in which.

DETAILED DESCRIPTION

In the present disclosure, embodiments are described in which a user may interact with a user terminal equipped with a touchscreen by means of a pattern traced on the display of the user terminal.

In one embodiment, a user terminal (UT) is equipped with at least two cameras, and the user terminal is configured to capture video data using one of the cameras and to transit that video data to a remote device as part of a communication event, e.g. a video call. In this embodiment, the terminal can detect if a user traces a pattern on the display screen of the UT. If the UT determines that the user has traced a pattern on the screen, the UT switches cameras so as to capture image data for the video call using another camera.

Optionally, the user may trace the pattern at any location of the display screen. Alternatively, the UT may only switch the cameras used to capture the video data if the user traces the pattern within a certain area of the display screen.

In another embodiment a user terminal can detect a pattern traced on the display screen of said terminal. The user terminal may detect that a predetermined pattern has been traced if the traced pattern satisfies certain rules that characterise that pattern. This may allow the pattern to be detected regardless of the location, size and orientation of the traced pattern.

Embodiments of the present disclosure will now be described by way of example only.

Figure 1:
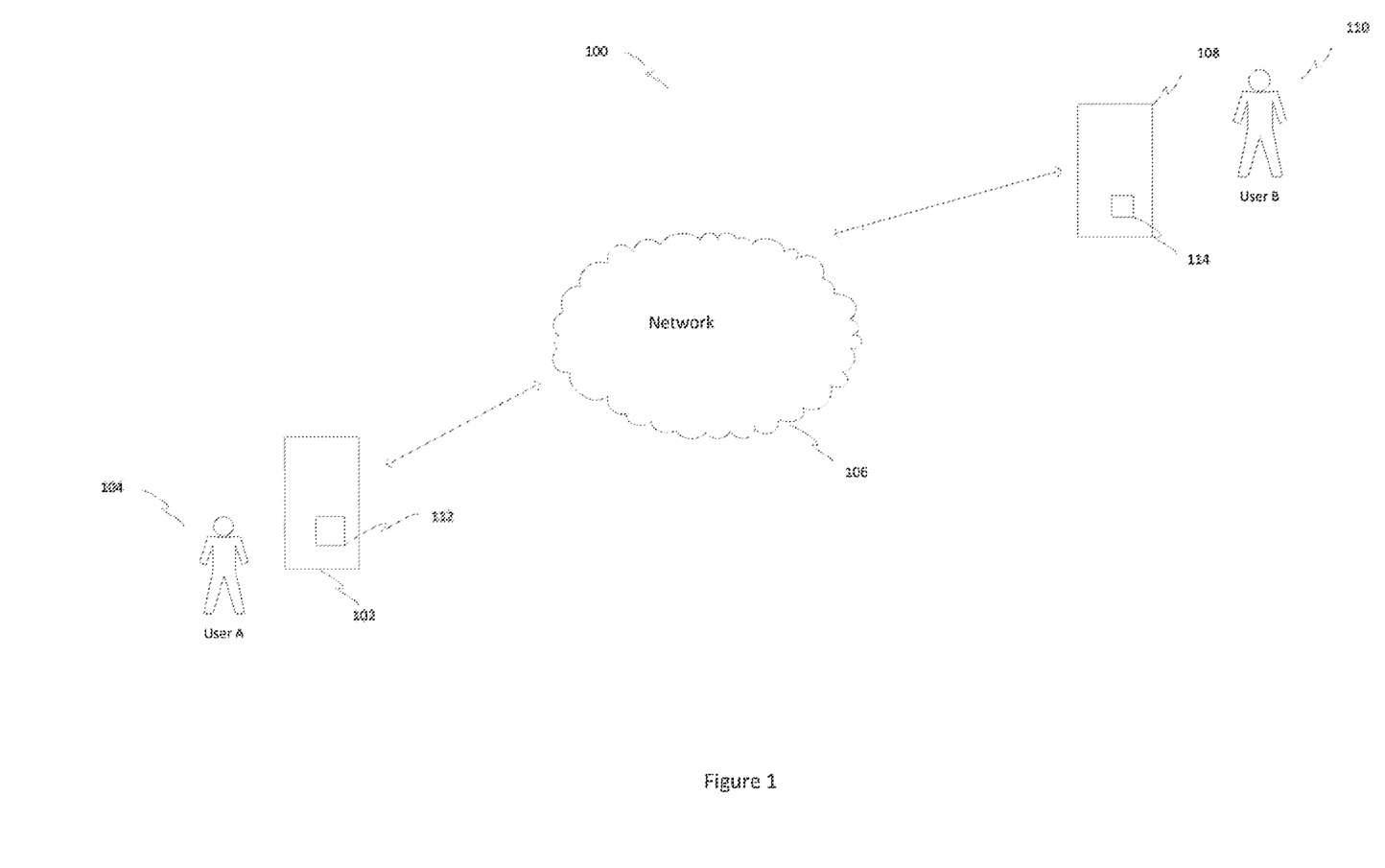
FIG. 1 shows a schematic illustration of a communication system.

FIG. 1 shows a communication system 100 comprising a first user 104 (User A) who is associated with a first user terminal 102 and a second user 110 (User B) who is associated with a second user terminal 108. Whilst only two users have been shown in FIG. 1 for simplicity, the communication system 100 may comprise any number of users and associated user devices. The user terminals 102 and 108 can communicate over the network 106 in the communication system 100, thereby allowing the users 104 and 110 to communicate with each other over the network 106. The network 106 may be any suitable network which has the ability to provide a communication channel between the first user terminal 102 and the second user terminal 108. For example, the network 106 may be the Internet or another type of network such as a High data rate mobile network, such as a $3^{rd}$ generation ("3G") mobile network. The user terminal 102 may be, for example, a mobile phone, a personal digital assistant ("PDA"), a personal computer ("PC") (including, for example, Windows™, Mac OS™ and Linux™ PCs), a gaming device or other embedded device able to connect to the network 106. The user terminal 102 is arranged to receive information from and output information to the user 104 of the user terminal 102. In one embodiment the user terminal 102 comprises a display such as a screen and an input device such as a keypad, a touchscreen, and/or a microphone. The user terminal 102 is connected to the network 106.

With increasing mobile bandwidths, there is increasing interest in providing packet-based video calls via client applications running on mobile devices such as Internet-enabled mobile phones. These mobile devices comprise transceivers such as short-range RF transceivers operating on one or more unlicensed bands for accessing the Internet via wireless access points (e.g. of Wi-Fi access points of WLAN networks), and/or cellular transceivers operating on one or more licensed bands for accessing the Internet via a packet-based service of a cellular network such as GPRS (General Packet Radio Service) or HSPA (High Speed Packet Access).

The user terminal 102 executes a communication client 112, provided by a software provider associated with the communication system 100. The communication client is a software program executed on a local processor in the user terminal 102 (i.e. a communications module). The client performs the processing required at the user terminal 102 in order for the user terminal 102 to transmit and receive data over the communication system 100.

The user terminal 108 may correspond to the user terminal 102. The user terminal 108 executes, on a local processor, a communication client 114 which corresponds to the communication client executed at the user terminal 102. The client at the user terminal 108 performs the processing required to allow the user 110 to communicate over the network 106 in the same way that the client at the user terminal 102 performs the processing required to allow the user 104 to communicate over the network 106. The user terminals 102 and 108 are end points in the communication system. FIG. 1 shows only two users (104 and 110) and two user terminals (102 and 108) for clarity, but many more users and user devices may be included in the communication system 100, and may communicate over the communication system 100 using respective communication clients executed on the respective user devices, as is known in the art.

Figure 2:
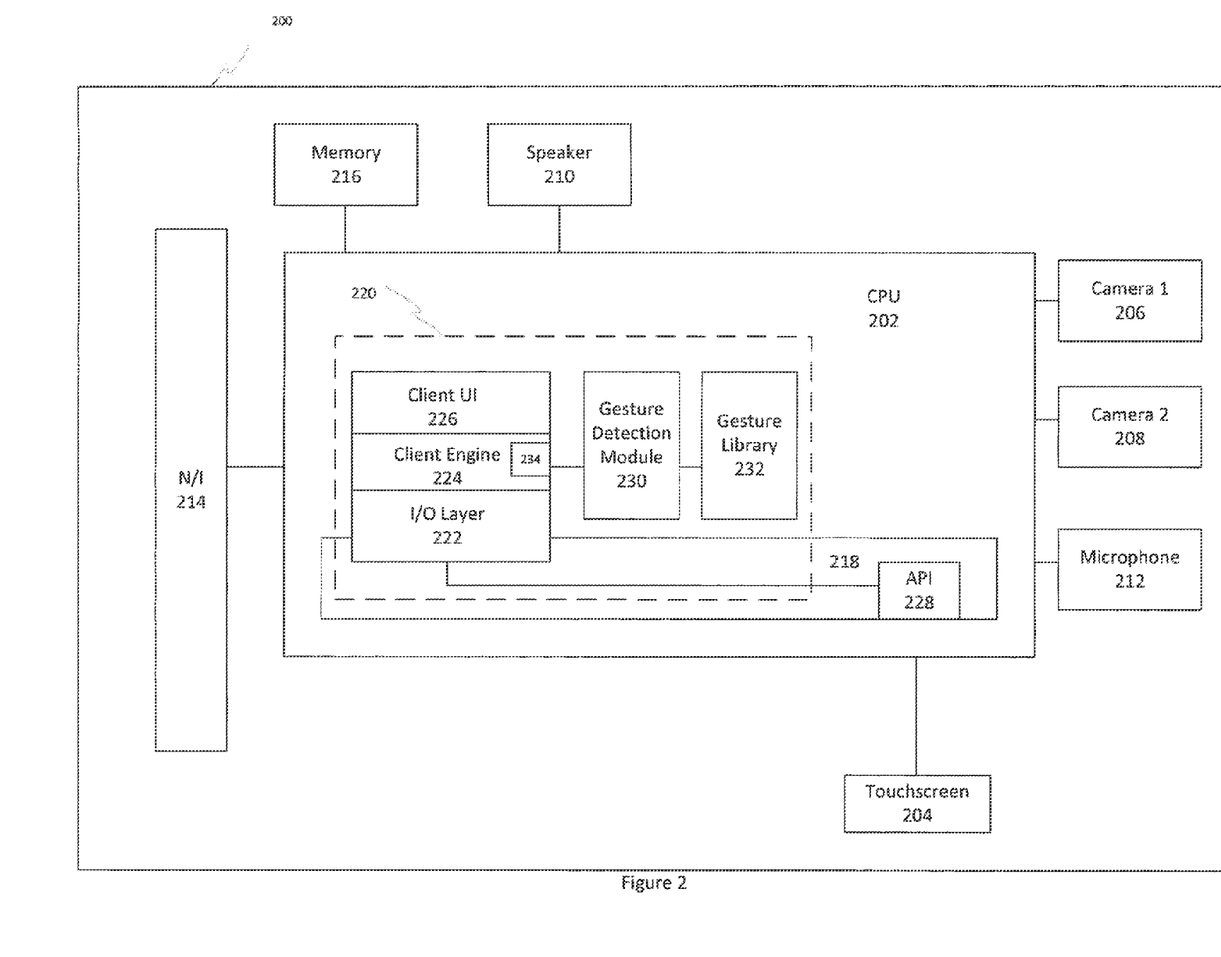
FIG. 2 shows a detailed view of a user terminal.

FIG. 2 illustrates a detailed view of the user terminal 102 on which is executed a communication client 112 for communicating over the communication system 100. The user terminal 102 comprises a central processing unit ("CPU") 202, to which is coupled a touchscreen 204. The CPU is connected to a first camera 206 and a second camera 208. An output audio device 210 (e.g. a speaker) and an input audio device 212 (e.g. a microphone) are connected to the CPU 202. The touchscreen 204, cameras 206 and 208, output audio device 210 and input audio device 212 may be integrated into the user terminal 102 as shown in FIG. 2. In alternative user terminals one or more of the touchscreen 204, the cameras 206 and 208, the output audio device 210 and the input audio device 212 may not be integrated into the user terminal 102 and may be connected to the CPU 202 via respective interfaces. One example of such an interface is a USB interface. The CPU 202 is connected to a network interface 214 such as a modem for communication with the network 106. The network interface 214 may be integrated into the user terminal 102 as shown in FIG. 2. In alternative user terminals the network interface 214 is not integrated into the user terminal 102. The user terminal 102 also comprises a memory 216 for storing data as is known in the art. The memory 216 may be a permanent memory, such as ROM. The memory 216 may alternatively be a temporary memory, such as RAM. The touchscreen may be configured to react to the touch of a user, for example from the user's hand. Alternatively or in addition, the touchscreen may be operated by use of a stylus.

FIG. 2 also illustrates an operating system ("OS") 218 executed on the CPU 202. Running on top of the OS 218 is a software stack for a communication client application 220. The software stack shows an I/O layer 222, a client engine layer 224 and a client user interface layer ("UI") 226. Each layer is responsible for specific functions. Because each layer usually communicates with two other layers, they are regarded as being arranged in a stack as shown in FIG. 2. The operating system 218 manages the hardware resources of the computer and handles data being transmitted to and from the network 106 via the network interface 214. The I/O layer 222 comprises audio and/or video codecs which receive incoming encoded streams and decodes them for output to speaker 210 and/or touchscreen 204 as appropriate, and which receive unencoded audio and/or video data from the microphone 212 and/or cameras 206 and 208 and encodes them for transmission as streams to other end-user terminals of the communication system 100. The client engine layer 224 handles the connection management functions of the VoIP system as discussed above, such as establishing calls or other connections by server-based or P2P address look-up and authentication. The client engine may also be responsible for other secondary functions not discussed herein. The client engine layer 224 also communicates with the client user interface layer 226. The client engine layer 224 may be arranged to control the client user interface layer 226 to present information to the user of the user terminal 200 via the user interface of the client which is displayed on the touchscreen 204 and to receive information from the user of the user terminal 200 via the user interface. The client engine comprises a control module 234, which will be described in more detail below.

The communication client application 220 further comprises a gesture detection module 230 and a gesture library, whose function will be described in greater detail below.

The OS comprises one or more application program interfaces (APIs) 228. An API is an interface implemented by a hardware component or a program of a software component that allows a different hardware component or program of a software component to access services provided by the component implementing the API. Although only one API is shown in FIG. 2 for the purposes of clarity, it will be understood by the skilled person that an OS can contain multiple APIs. The APIs of the OS allow applications running on the OS to access services provided by the OS.

As has been described above, the touchscreen 204 allows a user of the UT 200 to interact with a GUI displayed on the touchscreen by direct manipulation, for example a user may touch a graphical icon displayed on the touchscreen. Detecting a gesture or a touch may broadly consist of two phases: (i) gathering data about the touch and/or gesture; and (ii) interpreting the data to determine whether it meets the criteria of any supported touch or gesture. With respect to the first phase, when a user places one or more fingers on an area of the touchscreen, the OS generates touch events that contain information relating to the interaction (such as, e.g., the coordinates of the touch, the pressure applied, the size, the time of the touch etc.) If the user traces a gesture, a sequence of touch events will be generated to provide details of each interaction.

The OS then informs the communication client of a detected gesture by providing it with the set of touch events via the API 228. The communication client can then use the data provided by the events to determine whether a gesture of interest has been traced. The communication client may be capable of recognising a set of gestures of interest that are each associated with a specific operation. The operation associated with each gesture can be determined by the developer of the communication client. The set of gestures may be 'custom' gestures in the sense that the gestures, and their associated operation, may be defined by the developer. Such a set of gestures can be stored in the gesture library 232 of the client application. Each time an event or set of events is received at the application, the client application can use the gesture library to attempt to recognize the gesture. The application may do this by use of the gesture detection module 230.

In one embodiment, when an event is received, the client application attempts to recognize the gesture by sending the event information to the detection module 230. The detection module 230 can then access the gesture library 232 to compare the detected gesture with the set of gestures stored in the library. For example, the detection module may compute a score or metric for each stored gesture. The detected gesture may be recognized as the stored gesture with the highest score.

If the detected gesture is recognized as a gesture from the gesture library, the detection module 230 informs the control module 234 that a gesture has been recognized. The control module 234 then causes the operation associated with the gesture to be executed.

In the embodiments described above, the client application 220 recognizes gestures traced on the touchscreen by use of a gesture library. In an alternative embodiment, the application does not contain a gesture library. In this alternative embodiment, the client application attempts to recognize the detected gesture by processing the event information.

The user terminal 108 is implemented in the same way as user terminal 102 as described above, wherein the user terminal 108 may have corresponding elements to those described herein in relation to user terminal 102.

In some embodiments, the communication client 112 performs the processing required in order for the user terminals 102 to participate in a communication event in which video data is transmitted and received over the communication system, for example a video call, or a conference call. In this embodiment, the I/O layer 22 receives unencoded video data from at least one of cameras 206 and 208 and encodes the data for transmission to other user terminals in the communication system 100. The I/O could also receive unencoded audio data from the microphone 212 associated with the video data, for example voice data from the user of the user terminal.

During such a communication event, the client user interface layer 226 may present information to the user of the user terminal relating to the communication event. For example, video data received over the communication network from other user devices participating in the communication event may be displayed on the touchscreen 204. Alternatively or in addition, information may be presented to the user to control the user's participation in the communication event. For example, graphical icons may be displayed that allow the user to end the call, control the volume of the audio data output from the user terminal etc.

Figure 3:
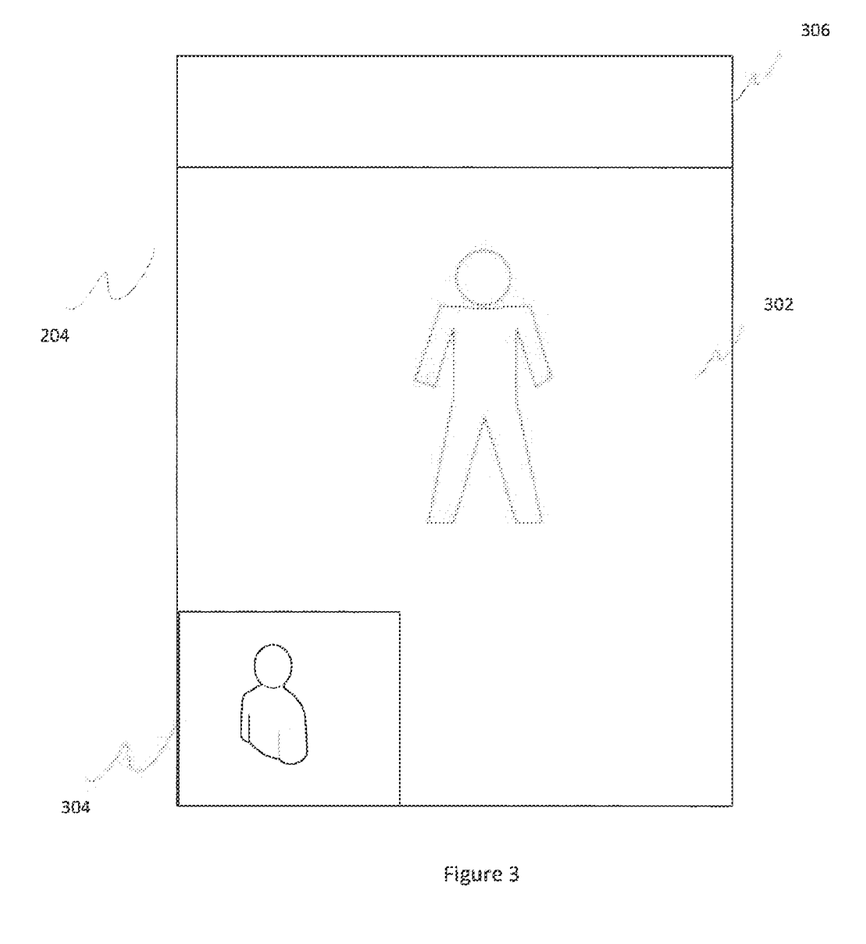
FIG. 3 shows a schematic illustration of a display screen of a user terminal during a video call.

FIG. 3 shows, by way of example only, a graphical user interface displayed on the touchscreen 204 of the user terminal during a video call, according to an embodiment of the present disclosure.

Displayed on the touchscreen 204 is a primary window 302 which displays the video data received at the user terminal 200 from a remote user terminal that is participating in the video call. A notification bar 306 is displayed along the upper edge of the touchscreen. The notification bar may be used to keep certain information about the user device visible to the user at all times during the communication event. For example, the notification bar may display icons that contain information relating to, e.g., the date, time, battery level of the user terminal and the signal strength currently experienced by the user terminal.

The area of the display screen reserved for the notification bar is controlled by the OS of the user terminal. In this way, the notification bar can be displayed on the display screen independently of the communication client 112 or any application running on the user terminal.

It will be appreciated that the position of the notification bar along the upper edge of the display is merely for the purpose of illustration, and that the notification bar may be placed at any area of the touchscreen. Alternatively, the touchscreen may not display a notification bar at all.

Also displayed on the touchscreen is a secondary window 304 which displays to the user of the terminal 200 the video data being transmitted to the remote user with which the user is communicating. That is, the secondary window displays the video data being captured from one of the cameras 206 or 208 of the user terminal 200 that is currently being transmitted to the remote terminal. The secondary window can be used to enhance the quality of the video call. For example, by viewing the video data being transmitted, the user can make adjustments to ensure the remote user is receiving suitable image data, such as by adjusting the position of the user terminal or by positioning himself in a more suitable position with respect to the user terminal.

It is to be understood that reference to the 'primary' and 'secondary' windows has no bearing on the relative size of these windows in relation to each other, but instead is used merely to indicate what video data is displayed in each window.

In alternative embodiments, there is no secondary window 304 displayed on the touchscreen 204, and only video data received over the communication network from the remote device is displayed on the touchscreen 204.

As has been explained above, the user terminal could be equipped with two cameras 206 and 208 positioned at different locations on the user terminal. For example, one camera (e.g. camera 206) could be position on the front side of the user terminal with the touchscreen, and another camera (e.g. camera 208) could be positioned on the opposing rear side of the user terminal. The user terminal 200 will capture image data from one of these cameras at a time for transmission to the remote device during a video call.

A user may wish to switch the camera used to capture the video data whilst the video call is ongoing. For example, the user of terminal 200 may wish to switch from the front camera, which is being used to transmit video data of the user, to the rear camera, which may for example be being used to capture video data of the user's surroundings.

According to an embodiment of the present disclosure, the user of terminal 200 can change the camera being used to capture the transmitted video data by tracing a pattern on an area of the touchscreen 204.

Consider, for example, the situation in which image data from camera 206 is being transmitted to a remote user as part of a video call. If the user traces a pattern on the touchscreen, the OS generates a set of touch events that contain information relating to the traced pattern. The set of touch events are then provided to the communication client. The communication client can be configured to associate one or more gestures with the operation of toggling between cameras used to capture the transmitted video data. Such gestures will be referred to as 'switch-camera' gestures for the purposes of clarity. The 'switch-camera' gestures may be custom gestures as defined by the developer.

The gesture detection module 230 of the communication client can compare the information from the touch event defining the traced gesture to information stored in the gesture library that defines recognizable gestures. If a gesture from the gesture library is recognized, the control module 234 is informed. If the control module determines that the recognized gesture is a 'switch-camera' gesture, it causes an operation to switch the supply of unencoded video data to the client application from camera 206 to camera 208 to be executed. Video data captured from camera 208 will then be transmitted to a remote user as part of the video call.

Thus according to the present embodiment, a user of a user terminal can switch the camera used to capture image data as part of a video call by tracing a pattern on a touchscreen of the user terminal. This may allow a user to quickly and easily switch the camera during a video call without having to, for example, navigate through multiple menus of the GUI or look for a specific graphical icon, both of which could require concentration and divert the user's attention away from the video call in which he/she is participating.

In some embodiments, the user can effect the change in camera by tracing the pattern at any location on the touchscreen 204. In other embodiments, the pattern may have to be traced within a certain sub-area of the touchscreen 204 to effect the change in cameras. Other areas of the touchscreen may be defined as excluded areas in which a user's trace does not cause a switch in cameras used to capture the video data. For example, if the GUI comprises a notification bar 306, then this could be an excluded area.

If the notification bar is to be an excluded area, then the OS can be configured to prevent any 'switch camera' gesture traced in this area from causing the communication client to switch the camera used to capture the video data. For example, the OS can determine from the touch events that a gesture has been traced in the area of the notification bar. The OS can determine that this is an excluded area and discard the touch events without sending them to the communication client.

The communication client itself may also follow a similar approach for its own display space in order to exclude certain areas of the application displayed on the GUI from gesture detection. For example, if the GUI displayed on the touchscreen during the video call comprises a primary window 302 and a secondary window 304 as shown in FIG. 3, the sub-area could be the area covered by the primary window and the area of the secondary window could be an excluded area. The communication client, rather than the OS, has control over the boundaries of the excluded areas for its own display space. That is, for gestures traced in these areas, the OS will send the touch events to the communication client. The client will then process these events and determine that the gesture was traced within an excluded area of the display space and consequently not execute the associated operation.

Although the above embodiment has been described with the secondary window 302 as being an excluded area, it will be understood that this is for the purposes of illustration only. Excluded areas of the client display space (if any), can be freely chosen by the developer.

If the GUI displayed on touchscreen 204 comprises a secondary window displaying the video data currently being transmitted to the remote device, then a change in the camera used to capture the video data could cause a corresponding change in the video data displayed in the secondary window. For example, the I/O layer 222 of the communication client could be configured to receive the video data from one of the cameras 206 or 208 for transmission to a remote device and the client UI layer 226 could be configured to cause that video data to be displayed in the secondary window 304. A change in the camera used to capture the video data (e.g., caused by the OS and communication client as described above) would then cause the video data from the new camera to be supplied to the I/O layer and therefore displayed in the secondary window 304.

Although in the above-described embodiments the cameras 206 and 208 were positioned on the front and rear surfaces of the user terminal respectively, it will be appreciated that the cameras can be positioned at any suitable location on the user terminal, for example the cameras may be positioned on the same surface of the user terminal.

In another embodiment, the user terminal may have more than one microphone, for example there may be a microphone associated with each camera of the user terminal. In this embodiment, upon detection that a pattern relating to the stored information has been traced on an area of the touchscreen, the communication client could be configured to control the microphones so as to supply audio data to the client application from the microphone associated with the newly switched camera.

In another embodiment, each of the one or more patterns that causes the cameras of the terminal to be switched requires more than one motion vector in order to trace. That is, each of the one or more identifiable patterns spans a two-dimensional space in the plane of the touchscreen 204.

For example, the one or more patterns could comprise at least one of the following: a circle, an arc, a triangle, the letter 'S', a square, a cross, etc.

In another embodiment, each of the one or more patterns comprises a series of at least two gestures, where each gesture in the series has a different motion vector than the preceding gesture in the series. An example of such a gesture could be, for example, a triangle, a square or a zigzag gesture representative of the letter 'Z'. Alternatively or in addition, a continuous curve traced by the user could be interpreted as a single gesture. It should be noted that, although a pattern may comprise a series of gestures, it may be traced without the user's tracing implement (e.g., finger or stylus) leaving the surface of the screen. That is, a series of gestures may be traced in a continuous fashion by the user.

By requiring that the traced patterns span a two-dimensional space and/or are a series of gestures with different motion vectors, the user of the terminal 200 is less likely to switch the cameras by accidently touching the touchscreen, compared to, for example, the situation where the cameras can be switched by touching a graphical icon. This is because a pattern that spans two-dimensions and/or is a series of gestures with different motion vectors requires a more deliberate action by the user and is less likely to be performed by accident.

In addition, requiring that the patterns comprise a series of at least two gestures, where each gesture in the series has a different motion vector than the preceding gesture in the series, allows for a greater tolerance in the form of the pattern traced by the user. In this embodiment, the gesture library does not store the geometric forms of the patterns, but instead stored information relating to the patterns. For example, the information could comprise a set of conditions that a pattern traced by a user must satisfy. In this example the conditions could be that (i) the pattern comprises a series of at least two gestures, and (ii) that each gesture in the series has a different motion vector than the preceding gesture in the series. In an alternative embodiment there may be an additional requirement that the first and third gestures in the series are parallel to each other. This alternative embodiment would limit the predetermined patterns to zigzag patterns.

By storing in the gesture library information comprising a set of conditions that characterizes the gestures, the tolerance in the traced gesture can be increased. For example, it may not matter where on the screen the gesture is traced, its size or is relative geometric proportions, provided that the traced pattern satisfies the conditions that characterize the recognizable gestures. Increasing the tolerance of the traceable patterns allows a user to trace a recognizable gesture with minimal effort or thought which reduces the distraction of the user from the task at hand, such as for example conducting a video call.

In an alternative embodiment still, the stored information could describe a template of at least one pattern. Information received from the touchscreen controller could be used to compare the pattern traced by the user to the template pattern. If the traced pattern matches the template to within a certain tolerance, the traced pattern could be identified as one of the template patterns.

If the stored information comprises a set of conditions, the information provided from the touch screen controller can be used with the stored information to determine that the user has traced an identifiable pattern. That is, the exact form of the pattern traced by the user is not important, so long as the traced pattern satisfies the set of conditions in the stored information. This may mean that there is no requirement on the size or relative shape of the predetermined pattern traced by the user, meaning the user can trace a predetermined pattern quickly and with minimal effort or thought as to the exact pattern being traced. It may also mean that the traced pattern can be identified regardless of the orientation of the traced pattern on the screen. This could allow the user the trace the pattern regardless of the orientation of the display screen, for example if the user terminal were a smartphone the pattern could be traced on the display screen of the smartphone regardless of whether the smartphone was in a portrait or landscape orientation.

Figure 4:
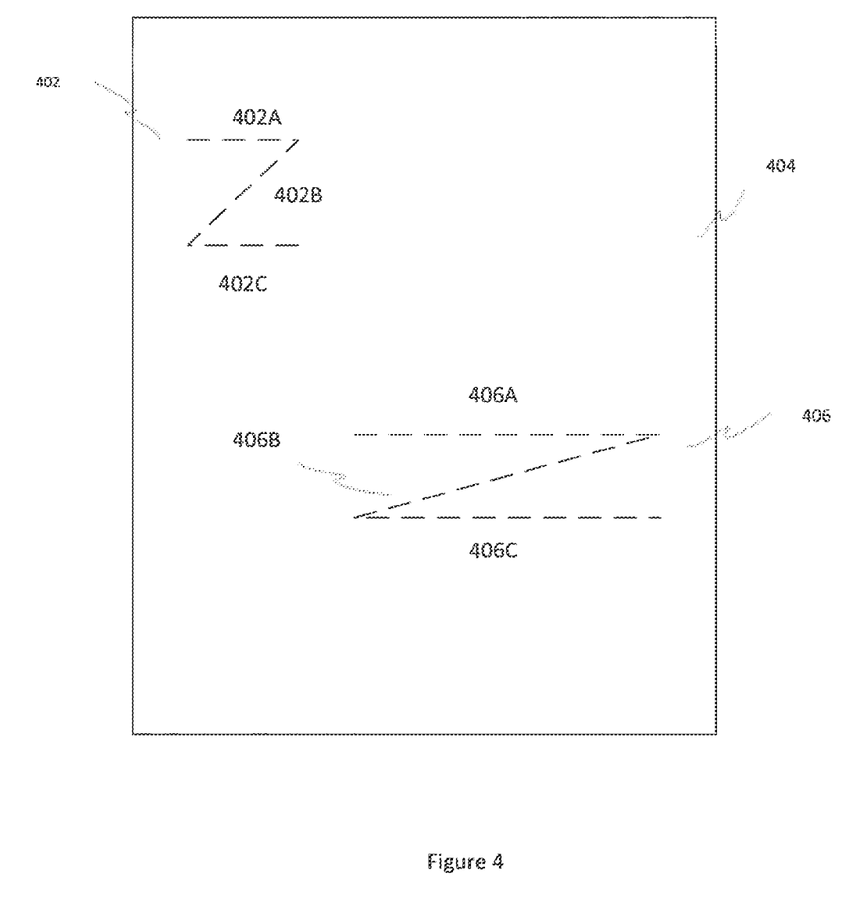
FIG. 4 shows a further schematic illustration of a display screen of a user terminal.

FIG. 4 shows an exemplary GUI displayed on a touchscreen 404 of a user terminal. For the purposes of illustration the GUI contains only a primary window 404, although in other embodiments the GUI could contain a secondary window and/or control bar as described above.

Depicted on the GUI are two 'zigzag' patterns 402 and 406, which represent two possible examples of a pattern traced by a user of the user terminal Although each pattern is a different size and relative proportion, both patterns could be recognised by the gesture detection module and could therefore be traced by a user of the terminal to switch the camera used to capture video data as part of a video call.

In an embodiment, the stored information in the gesture library could contain a set of rules relating to the relative motion vectors of the at least two gestures of the identifiable pattern. In the embodiment that the pattern is a zigzag, the rules could relate to the relative motion vectors of the three gestures that make the zigzag pattern.

For example, pattern 402 comprises the series of gestures 402A, 402B and 402C, where gesture 402B has a different motion vector to gesture 402A and gesture 402C has a different motion vector to gesture 402B. It may not matter in what order the series of gestures are traced, for example the gestures could be traced in the order of 402A, 402B and then 402C. Alternatively, the gestures could be traced in the order of 402C, 402B and then 402A. Similarly pattern 406 comprises the series of gestures 406A-C. If a user traced pattern 402, the user terminal could determine whether the relative motion between gestures 402A and gesture 402B, and between gestures 402B and 402C satisfy the stored rules in the gesture library relating to the relative motion between the gestures. Likewise, if the user traced pattern 406, the user terminal could determine whether the relative motion between gestures 406A and 406B, and between gestures 406B and 406C satisfy the stored rules. For example, the gesture library may store rules that specify a maximum and/or minimum direction change between gestures. If the traced pattern comprises gestures that fall within the boundaries set by these rules, the traced pattern is identified by the detection module as relating to a zigzag pattern. Alternatively, the stored information may relate to a template pattern and specify a tolerance that a traced pattern must fall within to be identified as being the template pattern. For example, the template pattern could be zigzag gesture and the stored information may specify a size or relative motion tolerance.

Having the identifiable pattern be a zigzag pattern may reduce the chances of a user of the terminal tracing the pattern by accident. It may also allow the user to trace the pattern using 1 hand or 1 finger only, allowing for the user to trace the pattern with relative ease and minimal effort. In addition, the zigzag is a natural pattern for a user to trace on the touchscreen and so may allow a user to trace the pattern with minimal discomfort or disruption to other tasks they may be performing, such as participating in a video call.

Although the above embodiments have been described in which a user of a user terminal traces a predetermined pattern to effect a change in camera used to capture video data as part of a video call, it will be appreciated that in other embodiments the user may trace a predetermined pattern to effect another action, such as, for example, ending a communication event or navigating through a GUI.

For example, in an alternative embodiment the predetermined pattern could be a series of gestures, where each gesture in the series has a different motion vector than the preceding gesture in the series, such as the zigzag pattern described above. Upon detecting the predetermined pattern being traced on an area of the touchscreen, the user terminal could be configured to perform any suitable action. For example, the user could trace the zigzag gesture to end a communication event such as a video call. Alternatively, the user may trace a zigzag pattern to disable the touchscreen so that further patterns traced on the screen elicit no effect. The user may then trace a further zigzag gesture on the screen so as to enable the touchscreen. In these embodiments the zigzag pattern may be detected in a manner as described above. That is, the predetermined pattern is detected by satisfying certain conditions, rather than the user having to trace the pattern on certain areas of the screen.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. microprocessors, CPU or CPUs). The program code can be stored in one or more computer readable memory devices. The features of the techniques described below are platform-independent, meaning that the techniques may be implemented on a variety of commercial computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user terminal comprising:
    a network interface;
    a touchscreen configured to receive a pattern traced by a user;
    a first camera configured to capture images, wherein the user terminal is configured to transmit said captured images from the first camera to at least one further user terminal via the network interface as part of a video call;
    a second camera;
    a memory configured to store information relating to at least one pattern;
    a detection module configured to detect, using said stored information, one of said at least one pattern traced on an area of the touchscreen of said user terminal, to detect including, at least, determining if at least one gesture in a series of gestures comprising the received pattern has a different motion vector than a preceding gesture in the series; and
    a control module configured to, in response to the detection by the detection module, switch from the first camera to the second camera so as to capture images using the second camera, the control module causing the said captured images from the second camera to be transmitted via the network interface to said at least one further user device.

2. A user terminal as claimed in claim 1, wherein each of the said at least one pattern comprises a series of at least two gestures, wherein each gesture in the series has a different motion vector.

3. A user terminal as claimed in claim 1, wherein the one of said at least one pattern is detected independently of: a location on the touchscreen where the pattern is traced, the size of the traced pattern and the orientation of the traced pattern.

4. A user terminal as claimed in claim 1, wherein:
    the detection module is further configured to, when capturing images using the second camera, detect one of said at least one pattern traced on the display screen and;
    the control module is further configured to, in response to the detection, switch from the second camera to the first camera so as to capture images using the first camera.

5. A user terminal as claimed in claim 1, further comprising:
    a first microphone; and
    a second microphone;
    wherein the user terminal is configured to capture audio data using the first microphone when capturing image data using the first camera and to capture audio data using the second microphone when capturing image data using the second camera.

6. A user terminal as claimed in claim 1, wherein said information relating to at least one pattern comprises conditions characterising a zigzag pattern.

7. A user terminal as claimed in claim 6, wherein:
    the conditions characterising the zigzag pattern comprise that the pattern traced by the user comprises a series of three gestures each with a different motion vector; and
    the detection module is configured to detect one of said at least one pattern if the pattern traced by a user satisfies the conditions.

8. A user terminal as claimed in claim 1, wherein the user terminal is configured to: receive video data from said at least one further user terminal via the network interface as part of the video call; display captured images from the first or second cameras on a first area of the touchscreen; and
    display the received video data on a second area of the touchscreen.

9. A user terminal as claimed in claim 8, wherein the detection module is configured to detect patterns traced in the second area of the touchscreen and wherein patterns traced in the first area of the touchscreen are not detected.

10. A user terminal as claimed in claim 2, wherein the stored information comprises rules relating to relative motion vectors of the at least two gestures.

11. A user terminal as claimed in claim 10, wherein the detection module is configured to detect one of said at least one pattern if the pattern traced by a user is within the rules relating to relative motion vectors of the at least two gestures.

12. A user terminal as claimed in claim 11, wherein the at least one pattern can be detected regardless of the size, location or orientation of the pattern traced on the touchscreen.

13. A user terminal as claimed in claim 10, wherein the at least one pattern can be detected regardless of the relative proportions of the pattern traced on the touchscreen.

14. A user terminal as claimed in claim 10, wherein a continuous curve traced on the display screen is a gesture.

15. A computer readable storage memory storing code for switching a first camera and a second camera of a user device during a video call between said user device and at least one further device which, when executed on a processor of a user device, is configured to:
    capture images using the first camera of the user device and transmit said captured images from the first camera to said at least one further user device;
    store information relating to at least one pattern in a memory of said user device;
    detect, using said stored information, one of said at least one pattern traced on an area of a touchscreen of said user device, said stored information comprising, at least, a set of rules specifying maximum and minimum direction changes between gestures comprising said one of said at least one pattern; and
    in response to the detection, switch from the first camera to the second camera of the user device so as to capture images using the second camera and transmit said captured images from the second camera to said at least one further user device.

16. A computer-readable storage memory as claimed in claim 15, wherein each of the said at least one pattern comprises a series of at least two gestures, wherein each gesture in the series has a different motion vector.

17. A computer readable storage memory as claimed in claim 16, wherein the stored information comprises rules relating to the relative motion vectors of the at least two gestures.

18. A computer-readable storage memory as claimed in claim 17, wherein the rules relating to the relative motion vectors of the at least two gestures characterise a zigzag pattern.

19. A computer-readable medium storage memory as claimed in claim 17, wherein the at least one pattern can be detected regardless of location, size or orientation of the pattern traced on the touchscreen.

20. A method of detecting a pattern traced on a display of a user device, the method comprising:
- receiving information relating to a pattern traced by a user on the display of the user device;
- determining from the received information if the pattern traced by the user comprises a series of three gestures;
- determining from the received information if each gesture in the series has a different motion vector and the relative motions of the motion vectors; and
- determining that a predetermined pattern has been traced on the display of the user device if the traced pattern comprises a series of three gestures and the relative motion vectors of the three gestures are within rules stored in memory which characterise a zigzag, regardless of the location, size and orientation of the traced pattern.

* * * * *